Dec. 4, 1962 R. C. JONES ET AL 3,067,420
GASEOUS PLASMA LENS
Filed April 28, 1959 2 Sheets-Sheet 1
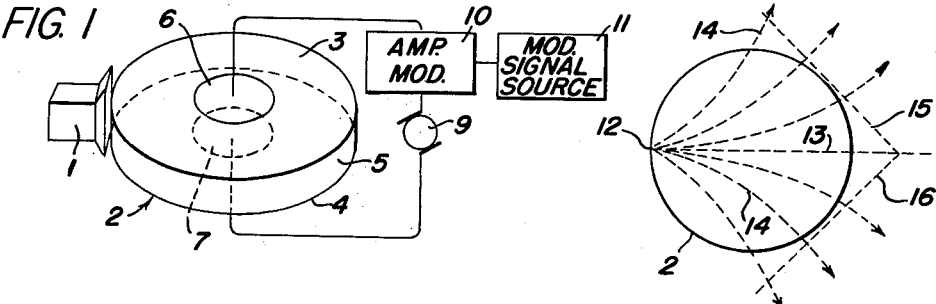
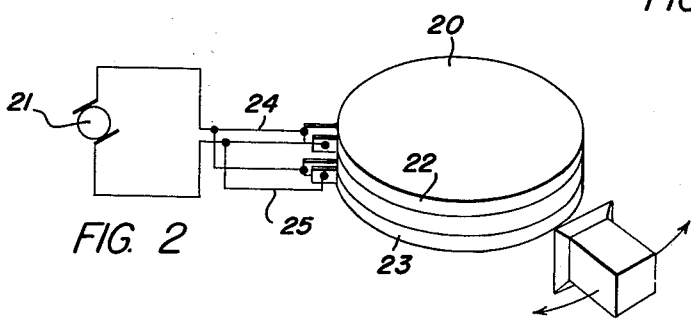
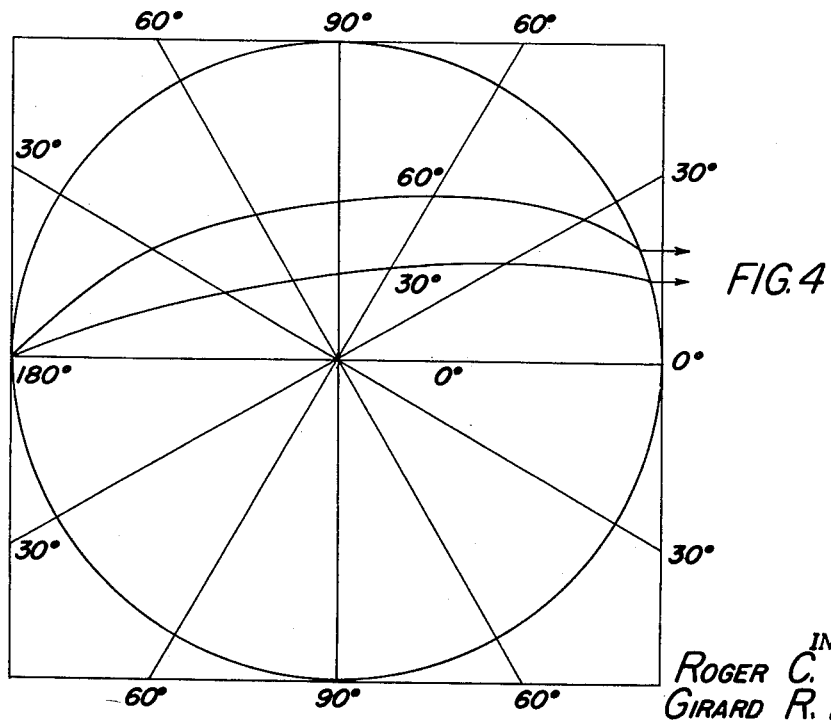
INVENTORS
ROGER C. JONES
GIRARD R. LOWREY, JR.
BY Hurwitz & Rose
ATTORNEYS

INVENTOR.
ROGER C. JONES
GIRARD R. LOWREY, JR.

BY

ATTORNEYS 3,067,420
GASEOUS PLASMA LENS
Roger C. Jones, Springfield, and Girard R. Lowrey, Jr., Fairfax, Va., assignors to Melpar, Inc., Falls Church, Va., a corporation of New York
Filed Apr. 28, 1959, Ser. No. 809,517
5 Claims. (Cl. 343—701)

The present invention relates generally to plasma lenses and more particularly to controllable gaseous plasma lenses employing controlled plasma resonance to vary the distribution function of dielectric constant within the lenses, the lenses being of the quasi Eaton or quasi Luneberg types.

The Eaton lens and the Luneberg lens are well known, per se. The Luneberg lens is a type which transforms a microwave electromagnetic wave emanating from a point source, such as a horn, into a U.H.F. plane wave; i.e., a wave having a planar wave front, the front advancing in line with the axis of symmetry of the original wave, which is also the optical axis of the lens. The Eaton lens acts to split an electromagnetic wave deriving from a point source, such as a horn, into a pair of diverging waves, symmetrical with the axis of symmetry of the original wave. The angle of divergence of the two emergent waves may be controlled by controlling the distribution function of the dielectric constant of the material of the lens; i.e., the gaseous plasma.

The normal Eaton lens usually is arranged to produce two wave fronts making an angle of 90° with one another. While such lenses may be designed to provide other than 90° separation, the beam angles cannot be changed after the antenna is built. According to the present invention, on the other hand, and by employing a gaseous plasma as the dielectric material of the lens, an antenna may be constructed which provides split beams separated by angles variable from 5° to 90°, the angle being readily controlled as a function of excitation of the plasma.

Briefly describing such a lens, it consists of a gas tube of suitable shape, preferably cylindrical, filled with suitable gas at suitable pressure and excited by R.F. voltage applied axially of the lens. By periodically varying the excitation, the beam patterns may be caused to scan periodically, and the rate of scan may be made as high as desirable.

As in the case of the Eaton lens, the conventional Luneberg lens is not susceptible of adjustment after it is built. According to the present invention, a Luneberg type lens is constructed in the form of a glass cylinder containing suitable gas at suitable pressure, the gas being excited in the plasma resonance mode. By controlling the excitation of the gas by means of R.F. coils, beam width can be varied while retaining the conventional characteristics of the lens in other respects.

The Eaton lens is described in an article by K. S. Kelleher entitled "Variable Index Lenses Which Produce Conical Wavefronts," published in Electromagnetic Wave Symposium, University of Michigan, June 1955. In this article it is shown that for $n=r$, $0 \leq r \leq 1$ a cylindrical wave front is generated. Here $n=$index of refraction of the tens and $r=$radius of the lens in terms of the phase delay caused thereby. The output of the lens may then be considered to consist of two beams having zero angular separation, i.e. $\beta=0$. For the pure Eaton lens, then, $$\beta = \frac{\pi}{2}$$

Intermediate values of $\beta$ may be attained by designing the lens according to the formula (1)
$$nr = \frac{2\left(\frac{r}{n}\right)^{\pi/2\beta}}{1 + \left(\frac{r}{n}\right)^{\pi/\beta}}$$

the index of refraction being zero at the center of the lens and unity at the edge. This formula can be employed for the quasi Eaton lens except for values of $n=0$, at the center. In addition, a small lip or region where $n$ is slightly greater than unity near the edge of the lens, may be neglected.

In accordance with the invention, it can be shown that an "E" type discharge of sufficiently high frequency will cause approximately the correct spatial distribution, at least for values of $\beta$ not too close to $\pi/2$.

For a desired value of $\beta$, $n$ can be solved for, as a function of $r$, from Formula 1. To provide an easy example, assume $\beta=30°$. Then $\pi/\beta=6$ and $\pi/2\beta=3$ which leads to (2)    $n^6 - 2r^2 n^2 + r^6 = 0$ $n$ may then be plotted as a function of $r$. Given $n$, the numerical density $\rho$ of electrons in the plasma may be computed from (3)
$$\rho = \frac{4n^2(1-n^2)}{4n^2 - \left(\frac{\nu}{\omega}\right)^2} \frac{m\omega^2 \epsilon_0}{e^2}\left[1 + \left(\frac{\nu}{\omega}\right)^2\right]$$

where $\nu$ is collision frequency, $m$ and $-e$ are mass and charge of the electron, $\omega$ the angular frequency of the exciting source, and $\epsilon_0$ the permitivity of space.

The Formula 3 cannot be used for $\nu \leq 2\omega n$ and extremely small values of $n$ are excluded.

To provide a numerical example for $\beta=30°$, $f=2\pi\omega=3$ kmc. and $\nu=5(10)^8$ sec.$^{-1}$ (4)
$$\rho = 1.117(10)^{11} \frac{n^2(1-n^2)}{n^2 - 0.000176} \text{ cm.}^{-3}$$

$$\approx 1.117(10)^{11}(1-n^2)\text{cm.}^{-3}$$

The original Luneberg lens was designed to meet the criteria (5)    $n^2 = 2 - r^2$    $0 \leq r \leq 1$ The lens had an index of refraction varying from $\sqrt{2}$ at the center to unity at the edges. These constants are inapplicable to plasma lenses, for which the index of refraction is generally less than unity. For the plasma lens, then, the index of refraction should proceed from $n_0 \leq 1$ at the center of the lens, to $n_0/\sqrt{2}$ at the edges. A further refraction then occurs in proceeding from the lens into the atmosphere, which must be accounted for if plane wave output is to be achieved. To this end the variation of index of refraction is selected so that the rays of the wave bend slightly inwardly, toward the optical axis, at the edges of the lens. The transition from the lens to the external medium then effects correction to a plane wave. The principal effect on the emerging rays from the region of maximum electron density, or minimum index of refraction, to the surrounding air, for which $n=1$, will be a refraction towards the normal to the outer surface of the lens. This assumes (*a*) that the walls of the lens are thin and (*b*) that a region of maximum electron density is kept until close approach to the wall.

An approximate solution is given by (6) $\quad n=\sqrt{1-ar^2} \quad 0 \leqslant r \leqslant 1$ (7) $\quad a=\dfrac{\sin^2 \alpha_0 - \cos^2 \alpha_0 + \cos \alpha_0}{2 \sin^2 \alpha_0}$ where $\alpha_0$ is a fixed angle less than 90°. For a value of $n+\rho$ given by Equations 6 and 3, rays leaving a point source and proceeding at angle $\alpha_0$ to the diameter of the lens will emerge parallel to the diameter. The axial ray, which enters along the diameter, will be undeviated. Rays initiated at slightly smaller or larger angles will also emerge generally parallel to the axial ray.

To take an example, if $\alpha_0=30°$, the minimum value of $n$, at the edge of the lens, is 0.518. Rays initially inclined at 30° and 0° are undeviated. Rays initially inclined at 15° are deviated a small fraction of a degree, and rays deviated as much as 60° initially emerge with a deviation of only 5.4°.

The equation of the paths of a ray starting at $0=180°$, and at an initial inclination of $\alpha$ to the optical axis is (8) $\quad 2ar^2=\dfrac{\phi}{1-\sqrt{1-\phi} \sin [2\theta-(270°+\theta_0)]^2}$ where (9) $\quad \phi=4a(1-a) \sin^2 \alpha$ and $\theta_0$ is the angle between the optical axis and the radius vector from the center of the lens to the point at which the ray emerges, given by

(10) $\quad \theta_0=90°-\arcsin \dfrac{2a-\phi}{2a\sqrt{1-\phi}}$

With the undeviated ray at 30°, and for $f=3$ kmc. and $\nu=5(10)^8$ sec$^{-1}$

(11) $\quad \rho=1.117(10)^{11}(1-n^2)=8.18(10)^{10}r^2$ cm.$^{-3}$

It is accordingly, a broad objective of the present invention to provide a plasma resonance lens for radio waves.

It is another object of the present invention to provide a quasi Eaton lens for radio waves, employing plasma as the dielectric material of the lens.

It is a further object of the invention to provide a quasi Luneberg lens for electromagnetic waves, the lens employing gaseous discharge plasma as dielectric material for the lens.

It is a broad object of the invention to provide a novel lens for electromagnetic waves, the lens comprising a container for gaseous discharge plasma, and employing novel distribution functions of electron density in the plasma, and thereby of dielectric constant.

The above and still further objects, features and advantages of the present invention will become apparent upon consideration of the following detailed description of specific embodiments thereof, especially when taken in conjunction with the accompanying drawings, wherein:

FIGURE 1 is a view in perspective of a quasi Eaton lens employed in a radiation beam scanning system;

FIGURE 2 is a view in perspective of a quasi Luneberg lens employed in a radiation beam scanning system;

FIGURE 3 is a plan view of a quasi Luneberg lens, analogous to FIGURE 1, showing ray paths and wave fronts;

FIGURES 4–8 are plots of calculated values, useful in designing lens according to FIGURES 1 and 2, and/or predicting their properties.

Figure 5:
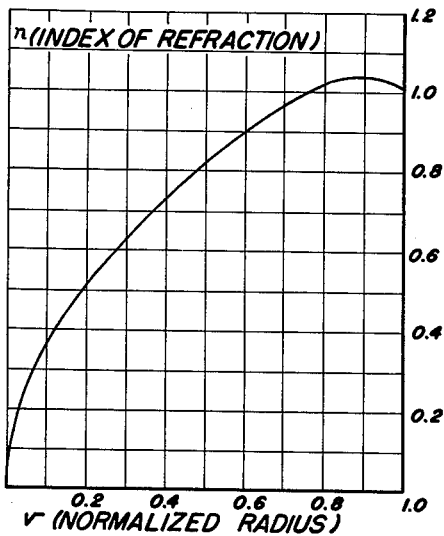

Referring now more particularly to FIGURE 1 of the accompanying drawings, the reference numeral 1 denotes a horn, from which is radiated a beam of electromagnetic radiation in the direction generally of the optical axis of a lens 2. The lens 2 is hollow, its walls being fabricated quartz or glass, and as thin as is compatible with adequate mechanical strength. The lens 2 is cylindrical, having a top wall 3, and a bottom wall 4, and a cylindrical wall 5. The optical axis of the lens 2 is diametral, and parallel to walls 3 and 4. Secured to the top wall 3 is a disc shaped metallic electrode 6, and to the bottom wall 4 a similar metallic electrode 7. To provide numerical examples of size, the diameter of the lens may be about 12 inches, and of the disc shaped electrodes about 4 inches. The height of the cylinder may be 2 inches–3 inches.

Internally of the lens 2 may be a gas, suitable examples being He, Argon, Kr, Xe, or the like readily ionizable gases, at pressures of .1 mm. to several mm. of Hg, approximately. The frequency of the radiation emitted by horn 1 may be about 3 kmc.

The electrodes 6 and 7 may be connected to the terminals of a generator 9 operating at about 30 mc. and capable of delivering about 100 watts, with field strengths considerably above the critical value for the gas employed.

In series with the generator 9 is included modulator 10, responsive to a signal source 11, in turn responsive to a modulating signal provided by a low frequency source 11, operative from essentially zero to perhaps 100,000 c.p.s.

The generator 9 in conjunction with electrodes 6, 7 is suitable for ionizing the gas contained in lens 2 to a condition of plasma resonance, and in a suitable distribution function, the density of the electrons of the plasma establishing the dielectric constant of the plasma. The dielectric constant has, then, a distribution function determined by the sizes of the electrodes, 6, 7, the dimensions of the lens 2, and the voltage of the generator 9, as seen at the electrodes 6, 7. By virtue of the action of modulator 9, this distribution function varies as a function of time, with consequent variation of the characteristics of the lens 2.

Referring to FIGURE 3 of the drawings, here is shown the paths of rays emanating from a source at 12, corresponding with the location of horn 1. One ray 13, heavily attenuated, passes along the optical axis of lens 2; the remaining rays 14 traverse curvilinear paths. These rays all emanate from lens 2 in such directions and phases as to give rise to wave fronts 15, 16 respectively, which are mutually perpendicular and make angles of 45° with the optical axis of the lens 2, in one typical case.

In accordance with the present invention, variation of voltage at electrodes 6, 7, due to the action of modulator 10, results in variation of the angle made by wave fronts 15, 16. Variation of values from 5° to 90° is obtainable, and the rate of variation may be extremely high, if desired. In the alternative, the angle may be adjustable to a desired value at will by omitting modulator 10 and substituting a steady control for the output of generator 9.

In FIGURE 2 is illustrated a horn 1 passing radiation through a quasi Luneberg lens 20, comprised of a glass enclosure, similar to that of FIGURE 1, containing identical or similar gas at similar pressure. The mode of excitation in the system of FIGURE 2 is different than in the system of FIGURE 1. The latter type is known as E type, whereas that of FIGURE 2 is known as H type. The nomenclature derives from the fact that the gas, in FIGURE 1, is voltage excited, whereas in FIGURE 2, the gas is excited by an electric field in the form of closed loops, resembling closed lines of magnetic force. More specifically, a current generator 21 is provided, which is connected in parallel to two sets of coils 22, 23 via leads 24, 25 respectively. The coils 22, 23 encircle the perimeter of lens 20, adjacent the upper and lower surfaces thereof, respectively. This effects plasma resonance in the gas included in the lens, and provides such a distribution function of dielectric constant that the characteristics of a Luneberg lens are simulated.

The horn 1 may be rotated about the vertical axis of lens 20 as an axis, to vary directivity of radiated pattern. The lens has the function of modifying the divergence of the radiated pattern, from that in which the wave front is perpendicular to the optical axis of the lens, to that in which some predetermined divergence is attained. The latter divergence may be less or more than is provided by the horn 1 alone.

The term plasma resonance has frequently been referred to as plasma oscillations or plasma-electron oscillations, see e.g. the "Physical Review," 1929, volume 33, page 195 ff. The term "plasma resonance" is utilized to describe the phenomenon Tonks refers to as plasma oscillations in our article which appears in the April 1959 issue of the "Microwave Journal," pages 21–26. It is intended that "plasma resonance" is to be synonymous with either of these frequently used terms.

The relationship between the dielectric constant of a plasma as a function of its charge density is treated in U.S. Patent No. 2,641,702, issued to Cohn et al., June 9, 1953. It is there shown that at high frequency the dielectric constant of a conductive gaseous discharge plasma depends on the electronic charge density contained in the plasma, the latter constituting the largest portion of the discharge column of a gaseous conduction tube. The relation between this dielectric constant and electronic charge density is given by $$(12) \qquad \epsilon_g = \epsilon_0 \left(1 - \frac{Ne^2}{m\omega^2}\right)$$

where $\epsilon_g$ is the effective dielectric constant at a frequency $\omega/2\pi$; $\epsilon_0$ is the dielectric constant of free space; $Ne$ is electronic charge density; $e/m$ is ratio of charge to mass of an electron. It will then be evident that the dielectric constant of plasma is lower than that of air.

In relation to the quasi Eaton lens, Formula 1 supra has been plotted in FIGURE 4 for a desired value of $\beta = 30°$, where $\beta$ is the cone angle of divergence of the beam emanating from the lens. Formula 4, giving electron density $\rho$ as a function of $n$ the index of refraction is plotted for the conditions stated in Formulas 2 and 3, in FIGURE 5 of the accompanying drawings.

Figure 6:
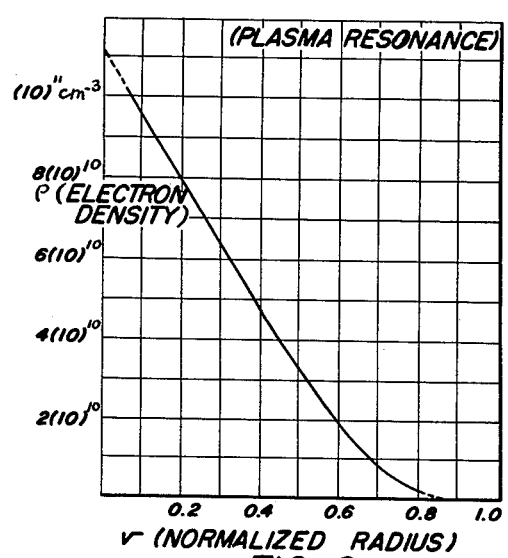
Figure 7:
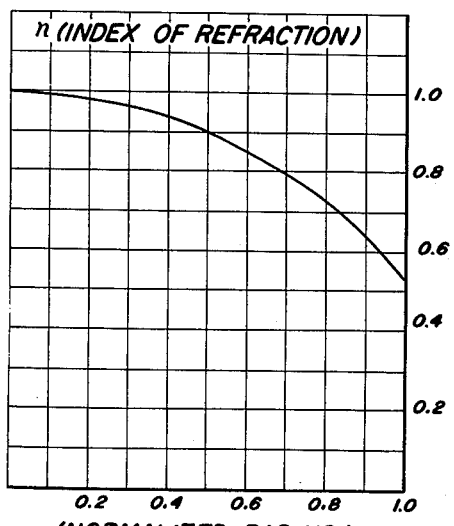
Figure 8:
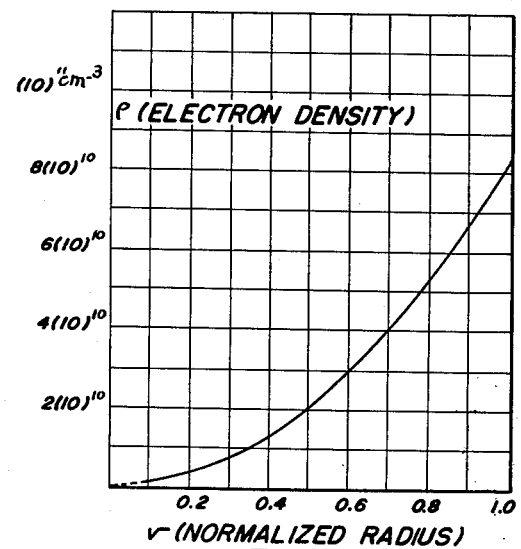

FIGURES 5, 6 show, respectively plots of $n$, $\rho$ for the quasi Eaton lens, wherein $r$, the normalized radius of the lens, is plotted as abscessae, with $n$, the index of refraction, and $\rho$, electron density, as ordinates. FIGURES 7 and 8 are similar plots of $n$, $\rho$ against $r$ for the quasi Luneberg lens. In FIGURE 4 is plotted the paths of three rays, through the lens, i.e. those deviated initially at 0°, 30°, and 60°, for the quasi Luneberg lens.

While we have described and illustrated one specific embodiment of the present invention, it will become apparent that variations of the specific details of construction may be resorted to without departing from the true spirit and scope of the invention as defined in the appended claims.

What we claim is:

1. A gaseous plasma lens, said lens being cylindrical and having a distribution of electron density which is circularly uniform on any given radius and non-uniform as a function of radius of said cylindrical lens, and means for transmitting electromagnetic energy through said lens in the general direction of one of said radii, wherein said distribution as a function of radius is such that electromagnetic radiation applied at a periphery of said lens in a diametral direction is transmitted from said lens as two waves having wave fronts diverging at equal angles from said diametral direction.

2. The combination according to claim 1 wherein is provided electrical means for varying said angles by varying said distribution of electron density.

3. A gaseous plasma lens, said lens being cylindrical and having a distribution of electron density which is circularly uniform on any given radius and non-uniform as a function of radius of said cylindrical lens, and means for transmitting electromagnetic energy through said lens in the general direction of one of said radii, wherein said distribution as a function of radius is such that electromagnetic radiation applied at a periphery of said lens in a diametral direction is transmitted from said lens with a predetermined divergence from said diametral direction.

4. The combination according to claim 3 wherein is provided electrical means for varying said divergence by varying said distribution of electron density.

5. A gaseous plasma lens, said lens being cylindrical and having a distribution of electron density which is circularly uniform on any given radius and non-uniform as a function of radius of said cylindrical lens, means for transmitting electromagnetic energy through said lens in the general direction of one of said radii, wherein said distribution as a function of radius is such that electromagnetic radiation applied at a periphery of said lens in a diametral direction is transmitted from said lens with predetermined divergence from said diametral direction, said plasma being plasma resonant and said electromagnetic radiation having a frequency far above the plasma resonant frequency of said plasma.

References Cited in the file of this patent

UNITED STATES PATENTS

| | | |
|---|---|---|
| 2,085,406 | Zworykin | June 29, 1937 |
| 2,142,648 | Linder | Jan. 3, 1939 |
| 2,840,820 | Southworth | June 24, 1958 |

OTHER REFERENCES

Kelleher, Electronics June 1956, pp. 138–142.